May 7, 1963  M. W. OGLESBY, JR., ET AL  3,088,664
METHOD OF AND APPARATUS FOR PROCESS DEAD TIME SIMULATION
Filed March 13, 1961
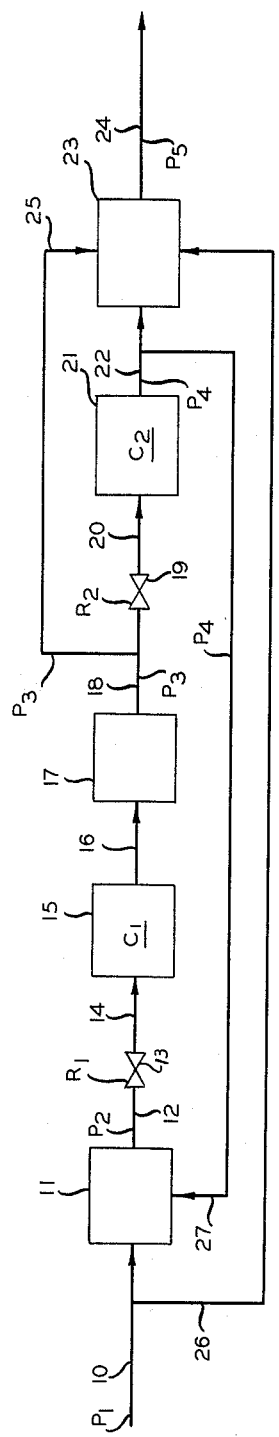
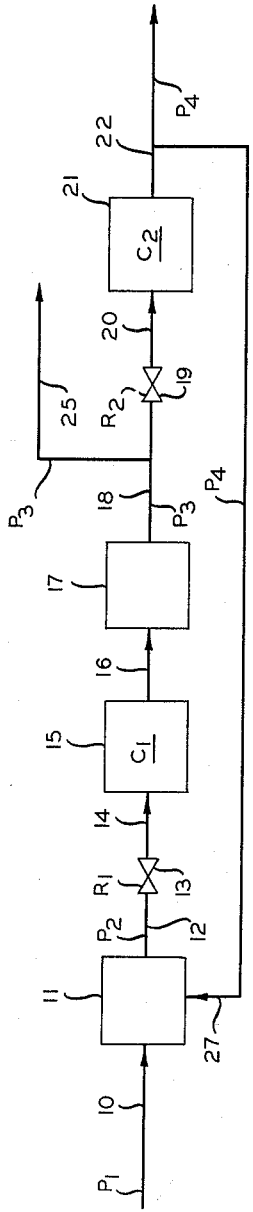
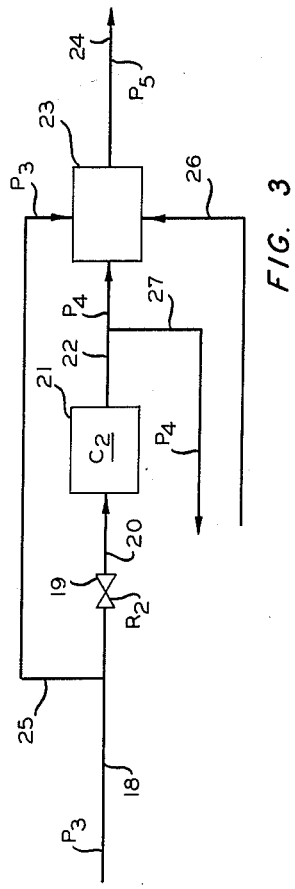
FIG. 1
FIG. 2
FIG. 3
INVENTORS
M. W. OGLESBY, JR.
R. T. BRASHEAR
BY *Hudson & Young*
ATTORNEYS United States Patent Office 3,088,664
Patented May 7, 1963

3,088,664
METHOD OF AND APPARATUS FOR PROCESS
DEAD TIME SIMULATION
Minor W. Oglesby, Jr., and Roy T. Brashear, Bartlesville, Okla., assignors to Phillips Petroleum Company, a corporation of Delaware
Filed Mar. 13, 1961, Ser. No. 95,089
6 Claims. (Cl. 235—61)

This invention relates to a method of and apparatus for simulating process dead time. In one specific aspect, this invention relates to a method of and apparatus for pneumatically simulating process dead time.

Dead time in a process can be defined as the time elapsing between the initiation of a change in the process and the detection of the effect of the change upon the process.

In some instances, a process or a part of a process can be characterized dynamically as a pure dead time. A pure dead time process is one which will pass all input signals unattenuated in amplitude but delayed in time by an amount equal to the dead time. Pure dead time processes or processes with long dead times as compared with their largest time constants are difficult to control with the conventional three-mode controller. In order for a process control loop containing dead time to be stable, the controller gain and reset action must be decreased from those values that could be used if the dead time was not present. This results in large deviations of the control variable from the set point and longer recovery time.

Procedures exist for compensating for dead time in process control, but to employ these procedures it is necessary to simulate the dead time in the process. The difficulty with this approach is that good reliable dead time models, a device dynamically equivalent to the control system which is being analyzed, are not available for plant operations.

When all variations or frequencies of a controlling variable are relayed, merely delaying the passage of said frequencies, said delay then is identified as pure dead time. With the unavailability of reliable and inexpensive dead time models, it is necessary to obtain an effective approximation of pure dead time for use in process control.

The prior art discloses several methods of obtaining a perfect dead time model such as employing an electromagnetic delay, a magnetic tape, magnetic drums or discs, punch tape, etc. However, these are all very expensive and are not commercially available or adaptable to plant operation.

Accordingly, an object of this invention is to provide an improved method and apparatus for simulating process dead time.

Another object of this invention is to provide an improved method of and apparatus for pneumatically simulating a second order dead time approximation.

Other objects, advantages, and features of our invention will be readily apparent to those skilled in the art from the above description and the appended claims.

A process control system based on approximate dead time is limited in the frequencies it can relay without alteration. The phase shift of an approximate dead time operation will be the same as for a pure dead time operation up to a maximum frequency and then will begin to deviate. By increasing the order of the approximation, the maximum frequency at which the phase shift of an approximate dead time operation and a pure dead time operation will be the same is increased.

Broadly, we have discovered a method of and apparatus for simulating a second order dead time approximation for a process control system having a long dead time. Further, we have discovered a method of and apparatus for simulating a long dead time in a process control system with said simulated dead time responding as a pure dead time at higher frequencies.

FIGURE 1 is a diagrammatic representation of the inventive pneumatic circuit for a simulated dead time of a second order approximation.

FIGURE 2 is a portion of the diagrammatic pneumatic circuit of FIGURE 1.

FIGURE 3 is another portion of the diagrammatic circuit of FIGURE 1.

Referring to FIGURE 1, there is illustrated a conduit means 10 for transmitting a pressure $P_1$ to a conventional pneumatic force balance computing relay 11, such as a Foxboro M58-1 computing relay illustrated in bulletin 13-19 distributed by Foxboro. The relay employed must be capable of solving the equation, $$X \text{ (Output)} = g \ (A-C)$$

where A and C are variables and $g$ is the adjustable gain of the relay. A conduit means 12 transmits a pressure $P_2$ from computing relay 11 to a flow restriction means 13 having a resistance $R_1$. Conduit means 14 transmits a reduced pressure from restriction means 13 to a capacitor 15 having a capacitance $C_1$. A restriction means and a capacitor connected as illustrated produces a first order lag. A conduit means 16 transmits a pneumatic pressure from capacitor 15 to a conventional 1:1 repeating relay 17. As hereinafter noted, under specified conditions repeating relay 17 can be removed from the pneumatic circuit. A conduit means 18 transmits a pneumatic pressure $P_3$ from repeating relay 17 to a restriction means 19 having a resistance $R_2$. Measuring the pressure drop across restriction means 13 and 19, and dividing each said pressure drop by the quantity of flow through each said restriction means is the method whereby values for $R_1$ and $R_2$ are obtained. A pnuematic pressure $P_3$ is transmitted from repeating relay 17 via conduit means 18 and 25 to a conventional force balance computing relay 23.

A reduced value of penumatic pressure $P_3$ is transmitted from restriction means 19 via conduit means 20 to a capacitor 21 having a capacitance $C_2$. Conduit means 22 transmits a pneumatic pressure $P_4$ from capacitor 21 to a conventional pneumatic force balance computing relay 23 such as a Foxboro M58-1 computing relay. The computing relay employed must be capable of solving the equation $X \text{ (Output)} = g \ (A-C) + B$, where A, B, and C are variables and $g$ is the adjustable gain of the relay. A conduit means 24 transmits an output pressure $P_5$ from computing relay 23. A pneumatic pressure $P_4$ is transmitted via conduits 22 and 27 from capacitor 21 to said conventional force balance computing relay 11. A pneumatic pressure $P_1$ is transmitted via conduit means 26 to said conventional force balance computing relay 23.

It is well known in the art that the transfer function for a second order dead time approximation is of the form:

$$\frac{(TS)^2 - 6TS + 12}{(TS)^2 + 6TS + 12}$$

where T is the dead time and S is the Laplace operator.

A second order dead time will perform as a pure dead time up to a frequency where:

$$W = 1.7/T$$

W is radians per minute and T is the dead time in minutes.

In the derivation of the transfer function of the pneumatic circuit of FIGURE 1, it is noted that the general form of the equation expressing the second order dead time approximation is:

$$\frac{\text{Output}}{\text{Input}} = \frac{(TS)^2 - 6TS + 12}{(TS)^2 + 6TS + 12}$$

By dividing the numerator by the denominator the following equation is obtained:

$$\frac{\text{Output}}{\text{Input}} = 1 - \frac{12}{T}\left[\frac{S}{S^2 + \frac{6S}{T} + \frac{12}{T^2}}\right]$$

Referring to FIGURE 2, there is illustrated a portion of FIGURE 1. The equation that relay 11 solves can be written as:

$$P_{2(S)} = g_1(P_{1(S)} - P_{4(S)})$$

where the subscript (S) denotes the Laplace form and $g_1$ is the gain in relay 11. The 1:1 relay 17 is used for isolation purposes only. Having relay 17 in this circuit prevents the loading of one pneumatic RC by another. Relay 17 can be removed from the pneumatic circuit in those special instances where the capacitance $C_1$ is relatively large when compared to the capacitance $C_2$. In this manner, the loading effect previously noted can be prevented.

From FIGURE 2 it can be seen that:

$$P_{3(S)} = \frac{P_{2(S)}}{(T_1 S + 1)} \text{ or } P_{3(S)}(T_1 S + 1) = P_{2(S)}$$

and:

$$P_{4(S)} = \frac{P_{3(S)}}{T_2 S + 1}$$

where S is the Laplace operator, time constant $T_1$ equals $R_1 C_1$, and time constant $T_2$ equals $R_2 C_2$.

Substituting the values for $P_2$, $P_3$ and $P_4$, obtained above in the equation for relay 11, there is obtained:

$$P_{3(S)}(T_1 S + 1) = g_1\left(P_{1(S)} - \frac{P_{3(S)}}{T_2 S + 1}\right)$$

or $P_3$ becomes:

$$P_{3(S)} = [P_{1(S)}]\frac{g_1(T_2 S + 1)}{(T_2 S + 1)(T_1 S + 1) + g_1}$$

Referring to FIGURE 3, the equation that relay 23 solves can be written as:

$$P_{5(S)} = g_2(P_{4(S)} - P_{3(S)}) + P_{1(S)}$$

where $g_2$ is the gain of relay 23. Substituting previously obtained values of $P_3$ and $P_4$ into the above equation, there is obtained the overall transfer function $P_5/P_1$ of the pneumatic circuit of FIGURE 1.

$$P_{5(S)} = g_2\left[\frac{P_{3(S)}}{(T_2 S + 1)} - P_{3(S)}\right] + P_{1(S)}$$

or $$P_{5(S)} = g_2\left[\frac{(P_{1(S)})(g_1)(T_2 S + 1)}{[T_2 S + 1][(T_2 S + 1)(T_1 S + 1) + g_1]}\right.$$
$$\left. - \frac{P_{1(S)} g_1(T_2 S + 1)}{(T_2 S + 1)(T_1 S + 1) + g_1}\right] + P_{1(S)}$$

$$\frac{P_{5(S)}}{P_{1(S)}} = 1 - \left[\frac{g_1 g_2}{T_1}\right]\left[\frac{S}{S^2 + \left(\frac{T_1 + T_2}{T_1 T_2}\right)S + \left(\frac{g_1 + 1}{T_1 T_2}\right)}\right]$$

Comparing the above equation with the conventional equation written for a second order dead time approximation establishes that the two equations are of the same form. If $T_1$, $T_2$, $g_1$, $g_2$ are adjusted so that the following equalities are satisfied, then the pneumatic circuit shown in FIGURE 1 will provide a second order dead time approximation $$\frac{g_1 g_2}{T_1} = \frac{12}{T}$$

$$\frac{T_1 + T_2}{T_1 T_2} = \frac{6}{T}$$

$$\frac{g_1 + 1}{T_1 T_2} = \frac{12}{T^2}$$

where T is the dead time being simulated. For any desired value of dead time, $T_1$, one of the four parameters ($T_1$, $T_2$, $g_1$ or $g_2$), can be assumed. The other three parameters can then be determined by the above equation.

By employing the disclosed inventive pneumatic circuit simulating a second order dead time approximation in series with a first order pneumatic dead time approximation circuit and/or other pneumatic second order dead time approximation circuits, higher order dead time approximations can be simulated.

An advantage of the inventive pneumatic circuit employed to simulate a second order dead time over an electronic circuit employed to simulate a second order dead time is the simplicity and low cost of the pneumatic circuit. Electronic circuits employed to simulate second and higher order dead time lags are extremely complex. Also, electronic circuits are not as compatible with present plant control systems as the pneumatic circuit, since most plant control systems are pneumatic. As a result, an electronic circuit requires a power supply and EMF to pneumatic transducers in addition to the basic circuit. This increases the complexity and cost of the electronic dead time approximation and reduces its reliability.

Although an electronic circuit can be employed to simulate a second order dead time approximation, it is not economically feasible to utilize the electronic circuit to simulate a relatively long dead time. For example, the capacitance of the electronic circuit is very limited for practical purposes while the capacitance of the pneumatic circuit can be readily expanded. As previously noted, the results obtained when an electronic circuit is employed to simulate a relatively long dead time approximation are not as reliable and the equipment required is far more expensive when compared to a pneumatic circuit.

As will be evident to those skilled in the art, various modifications of this invention can be made, or followed, in the light of the foregoing disclosure and discussion without departing from the spirit or scope thereof.

We claim:

1. A method of pneumatically simulating a second order dead time approximation which comprises passing a first pneumatic pressure $P_1$ representative of a measured condition to a first pneumatic computing zone and a second computing zone, passing a second pneumatic pressure $P_2$ hereinafter described to said first computing zone, said first computing zone solving the equation $$P_3 = g_1(P_1 - P_2)$$

where $g_1$ is the adjustable gain of said first computing zone, passing a third pneumatic pressure $P_3$ from said first computing zone and through a first pressure reducing zone having a resistance $R_1$ to a first storage zone having a capacitance $C_1$, passing a pressure $P_4$ from said first storage zone to a second pressure reducing zone having a resistance $R_2$ and to said second pneumatic computing zone, passing a pressure from said second pressure reducing zone to a second storage zone having a capacitance $C_2$, passing said second pneumatic pressure $P_2$ from said second storage zone to said first and second computing zones, said second computing zone solving the equation $$P_5 = g_2(P_2 - P_4) + P_1$$

where $g_2$ is the adjustable gain of said second computing zone, and passing a fifth output pneumatic pressure $P_5$ from said second computing zone in response to said first input pressure $P_1$ representative of said first pressure $P_1$ with a dead time of the second order.

2. The method of claim 1 wherein the pneumatic circuit is adjusted so that $$\frac{g_1 g_2}{R_1 C_1} = \frac{12}{T}$$

$$\frac{R_1C_1+R_2C_2}{(R_1C_1)(R_2C_2)}=\frac{6}{T}$$

$$\frac{g_1+1}{(R_1C_1)(R_2C_2)}=\frac{12}{T^2}$$

where T is the dead time being simulated.

3. A method of pneumatically simulating a second order dead time approximation which comprises passing a first pneumatic pressure $P_1$ representative of a measured condition to a first pneumatic computing zone and a second computing zone, passing a second pneumatic pressure $P_2$ hereinafter described to said first computing zone, said first computing zone solving the equation $$P_3 = g_1(P_1 - P_2)$$

where $g_1$ is the adjustable gain of said first computing zone, passing a third pneumatic pressure $P_3$ from said first computing zone and through a first pressure reducing zone having a resistance $R_1$ to a first storage zone having a capacitance $C_1$, passing a pressure $P_4$ from said first storage zone and through a 1:1 relay zone to a second pressure reducing zone having a resistance $R_2$ and to said second pneumatic computing zone, passing a pressure from said second pressure reducing zone to a second storage zone having a capacitance $C_2$, passing said second pneumatic pressure $P_2$ from said second storage zone to said first and second computing zone, said second computing zone solving the equation $$P_5 = g_2(P_2 - P_4) + P_1$$

where $g_2$ is the adjustable gain of said second computing zone, and passing an output pneumatic pressure $P_5$ from said second computing zone in response to said input first pressure $P_1$ representative of said first pressure $P_1$ with a dead time of the second order.

4. The method of claim 3 wherein the pneumatic circuit is adjusted so that $$\frac{g_1g_2}{R_1C_2}=\frac{12}{T}$$

$$\frac{R_1C_1+R_2C_2}{(R_1C_1)(R_2C_2)}=\frac{6}{T}$$

$$\frac{g_1+1}{(R_1C_1)(R_2C_2)}=\frac{12}{T^2}$$

where T is the dead time being simulated.

5. Apparatus comprising a first conduit means communicating with a first pneumatic computing means, said first pneumatic computing means capable of solving the equation $$X(\text{Output}) = g_1(A-C)$$

where A and C are variables and $g_1$ is the adjustable gain of said first pneumatic computing means, a second conduit means communicating between said first pneumatic computing means and a first means of pneumatically effecting an adjustable first order lag, a third conduit means communicating between said first means of pneumatically effecting a first order lag and a second means of pneumatically effecting an adjustable first order lag, a fourth conduit means communicating between said second means of pneumatically effecting a first order lag and a second pneumatic computing means, said second pneumatic computing means capable of solving the equation $$X(\text{Output}) = g_2(A-C) + B$$

where A, B and C are variables and $g_2$ is the adjustable gain of said second pneumatic computing means, a fifth conduit means communicating between said third conduit means and said second pneumatic computing means, a sixth conduit means communicating between said fourth conduit means and said first pneumatic computing means, a seventh conduit means communicating between said first conduit means and said second pneumatic computing means, and an eighth conduit outlet means communicating with said second pneumatic computing means.

6. Apparatus comprising a first conduit means communicating with a first pneumatic computing means, said first pneumatic computing means capable of solving the equation $$X(\text{Output}) = g_1(A-C)$$

where A and C are variables and $g_1$ is the adjustable gain of said first pneumatic computing means, a second conduit means communicating between said first pneumatic computing means and a first means of pneumatically effecting an adjustable first order lag, a third conduit means communicating between said first means of pneumatically effecting an adjustable first order lag and a pneumatic 1:1 relay means, a fourth conduit means communicating between said pneumatic 1:1 relay means and a second means of pneumatically effecting an adjustable first order lag, a fifth conduit means communicating between said second means of pneumatically effecting an adjustable first order lag and a second pneumatic computing means, said second pneumatic computing means capable of solving the equation $$X(\text{Output}) = g_2(A-C) + B$$

where A, B and C are variables and $g_2$ is the adjustable gain of said second pneumatic computing means, a sixth conduit means communicating between said fourth conduit means and said second pneumatic computing means, a seventh conduit means communicating between said fifth conduit means and said first pneumatic computing means, an eighth conduit means communicating between said first conduit means and said second pneumatic computing means, and a ninth outlet conduit means communicating with said second pneumatic computing means.

No references cited.